(12) United States Patent
Bai et al.

(10) Patent No.: US 12,157,841 B2
(45) Date of Patent: Dec. 3, 2024

(54) SOLVENTLESS ADHESIVE COMPOSITION PROCESS AND LAMINATE WITH SAME

(71) Applicants: Dow Global Technologies LLC, Midland, MI (US); Rohm and Haas Company, Collegeville, PA (US)

(72) Inventors: Chenyan Bai, Shanghai (CN); Elodie Hablot, Horgen (CH); Gaobing Chen, Shanghai (CN); Thorsten Schmidt, Horgen (CH); Abraham Barretto, Juinagar (IN)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 871 days.

(21) Appl. No.: 17/294,022

(22) PCT Filed: Nov. 16, 2018

(86) PCT No.: PCT/CN2018/115824
§ 371 (c)(1),
(2) Date: May 14, 2021

(87) PCT Pub. No.: WO2020/097900
PCT Pub. Date: May 22, 2020

(65) Prior Publication Data
US 2022/0010183 A1    Jan. 13, 2022

(51) Int. Cl.
| | | |
|---|---|---|
| *C09J 175/14* | (2006.01) | |
| *C08G 18/32* | (2006.01) | |
| *C08G 18/40* | (2006.01) | |
| *C08G 18/42* | (2006.01) | |
| *C08G 18/48* | (2006.01) | |
| *C08G 18/62* | (2006.01) | |
| *C08G 18/66* | (2006.01) | |
| *C08G 18/72* | (2006.01) | |
| *C08G 18/73* | (2006.01) | |
| *C08G 18/76* | (2006.01) | |
| *C09J 5/00* | (2006.01) | |

(52) U.S. Cl.
CPC ........ *C09J 175/14* (2013.01); *C08G 18/3206* (2013.01); *C08G 18/4063* (2013.01); *C08G 18/4238* (2013.01); *C08G 18/4829* (2013.01); *C08G 18/627* (2013.01); *C08G 18/6677* (2013.01); *C08G 18/722* (2013.01); *C08G 18/728* (2013.01); *C08G 18/73* (2013.01); *C08G 18/7671* (2013.01); *C09J 5/00* (2013.01)

(58) Field of Classification Search
CPC . C09J 175/14; C09J 5/00; C09J 175/04; C09J 175/06; C09J 175/08; C08G 18/3206; C08G 18/4063; C08G 18/4238; C08G 18/4829; C08G 18/627; C08G 18/6677; C08G 18/722; C08G 18/728; C08G 18/73; C08G 18/7671; C08G 18/10; C08G 18/12; C08G 18/4009; C08G 18/6644; C08G 18/724; C08G 18/792; C09D 175/04

See application file for complete search history.

(56) References Cited

U.S. PATENT DOCUMENTS

| | | | |
|---|---|---|---|
| 6,274,674 B1 | 8/2001 | Chang et al. | |
| 6,395,385 B1 | 5/2002 | Chang et al. | |
| 6,538,095 B2 | 3/2003 | Imai et al. | |
| 6,833,044 B2 | 12/2004 | Imai et al. | |
| 7,084,213 B2 | 8/2006 | McGrail et al. | |
| 8,507,059 B2 | 8/2013 | Kuriyama et al. | |
| 8,716,427 B2 | 5/2014 | Imai et al. | |
| 2002/0157789 A1* | 10/2002 | Imai ............... | C08G 18/7642 156/331.7 |
| 2004/0044141 A1 | 3/2004 | McGrail et al. | |
| 2017/0334183 A1* | 11/2017 | Kimura ............. | C08G 18/4808 |

FOREIGN PATENT DOCUMENTS

| | | | | |
|---|---|---|---|---|
| CN | 103289632 A | 9/2013 | | |
| CN | 106854449 A | 6/2017 | | |
| CN | 107001902 A | * 8/2017 | ............ | B32B 27/00 |
| CN | 107118734 A | 9/2017 | | |
| CN | 108659775 A | 10/2018 | | |
| WO | 2005/068576 A1 | 7/2005 | | |
| WO | 2007/138096 A1 | 12/2007 | | |

OTHER PUBLICATIONS

TW108141624 Search Report Dated Jul. 7, 2023 with English Translation.

* cited by examiner

*Primary Examiner* — K. Boyle
(74) *Attorney, Agent, or Firm* — Boyle Fredrickson, S.C.

(57) ABSTRACT

A process comprises (i) providing an isocyanate component A that is a reaction product of an aliphatic polyisocyanate, an aromatic polyisocyanate, an aliphatic polyester polyol, and a polyether polyol; (ii) providing a polyol component B comprising an aliphatic polyester polyol and a polyether polyol; (iii) mixing A and B to form a solventless adhesive (SLA) composition component A and component B each comprises an aliphatic polyester polyol having a viscosity from 800 to 6000 mPa·s at 25° C. and a hydroxyl number from 60 to 180 mg KOH/g; the SLA composition has (a) an initial viscosity at 40° C. from 500 to 1600 mPa·s, (b) an increasing viscosity ratio from 100% to 112% of the initial viscosity after the SLA composition stands at 40° C. for 10 min, and (c) an end viscosity at 40° C. from 120% to 210% of the initial viscosity at 40 min after forming the SLA composition.

13 Claims, No Drawings

SOLVENTLESS ADHESIVE COMPOSITION PROCESS AND LAMINATE WITH SAME

BACKGROUND

Composite laminated films are known in the field of packaging materials. These films are conventionally produced by bonding various plastic films and metal foils with an adhesive. The adhesive is often an organic solvent-based two-component curable adhesive comprising polyisocyanates, polyester polyols and polyether polyols.

Increasing regulations upon the use of solvents have led to the replacement of organic solvent-based adhesives with solvent-free, or solventless, adhesives in the production of composite laminated films. However, conventional solvent-free adhesives do not provide acceptable external appearance of the laminated films, even when laminating at high speed or laminating with a film having high rigidity such as polyethylene terephthalate film.

Thus, a low lamination speed (e.g., less than 80 meters per minute) is required, and causes reduction in working efficiency.

The art recognizes the need for improved solventless adhesives and methods of producing laminates using solventless adhesives.

SUMMARY

Disclosed herein is a process comprising (i) providing an isocyanate component A that is a reaction product of an aliphatic polyisocyanate, an aromatic polyisocyanate, an aliphatic polyester polyol, and a polyether polyol; (ii) providing a polyol component B comprising an aliphatic polyester polyol and a polyether polyol; component A and component B each comprising an aliphatic polyester polyol having a viscosity from 800 to 6000 mPa·s at 25° C. and a hydroxyl number from 60 to 180 mg KOH/g; (iii) mixing component A and component B to form a solventless adhesive (SLA) composition, the SLA composition having; (a) an initial viscosity at 40° C. from 500 to 1600 mPa·s, (b) an increasing viscosity ratio from 100% to 112% of the initial viscosity after the SLA composition stands at 40° C. for 10 min, and (c) an end viscosity at 40° C. from 120% to 210% of the initial viscosity at a time 40 min after forming the SLA composition.

Also disclosed herein is a solventless adhesive (SLA) composition comprising: an isocyanate component A that is a reaction product of an aliphatic polyisocyanate, an aromatic polyisocyanate, an aliphatic polyester polyol, and a polyether polyol; a polyol component B comprising an aliphatic polyester polyol and a polyether polyol; component A and component B each comprising an aliphatic polyester polyol having a viscosity from 800 to 6000 mPa·s at 25° C. and a hydroxyl number from 60 to 180 mg KOH/g, the SLA composition having; (a) an initial viscosity at 40° C. from 500 to 1600 mPa·s, (b) an increasing viscosity ratio from 100% to 112% of the initial viscosity after the SLA composition stands at 40° C. for 10 min, and (c) an end viscosity at 40° C. from 120% to 210% of the initial viscosity at a time 40 min after forming the SLA composition.

Also disclosed herein is a laminate product comprising: a first film layer; a second film layer; and a solventless adhesive (SLA) layer between the first film layer and the second film layer, the SLA layer comprising; an isocyanate component A that is a reaction product of an aliphatic polyisocyanate, an aromatic polyisocyanate, an aliphatic polyester polyol, and a polyether polyol; a polyol component B comprising an aliphatic polyester polyol and a polyether polyol; component A and component B each comprising an aliphatic polyester polyol having a viscosity from 800 to 6000 mPa·s at 25° C. and a hydroxyl number from 60 to 180 mg KOH/g, the SLA layer having (a) an initial viscosity at 40° C. from 500 to 1600 mPa·s, (b) an increasing viscosity ratio from 100% to 112% of the initial viscosity after the SLA composition stands at 40° C. for 10 min, and (c) an end viscosity at 40° C. from 120% to 210% of the initial viscosity at a time 40 min after forming the SLA composition.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percentages are based on weight and all test methods are current as of the filing date of this disclosure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "isocyanate" is a chemical that contains at least one isocyanate group in its structure. An isocyanate group is represented by the formula: —N=C=O. An isocyanate that contains more than one, or at least two, isocyanate groups is a "polyisocyanate." An isocyanate that has two isocyanate groups is a diisocyanate and an isocyanate that has three isocyanate groups is a triisocyanate, etc. An isocyanate may be aromatic or aliphatic.

A "polyisocyanate" is a molecule that contains at least two isocyanate groups.

A "polyether" is a compound containing two or more ether linkages in the same linear chain of atoms.

A "polyester" is a compound containing two or more ester linkages in the same linear chain of atoms.

A "polyol" is an organic compound containing multiple hydroxyl (OH) groups. In other words, a polyol contains at least two OH groups. Nonlimiting examples of suitable polyols include diols having two OH groups, triols having three OH groups, and tetraols having four OH groups.

A "polyester polyol" is a compound that contains a polyester and a polyol.

A "film," including when referring to a "film layer" in a thicker article, unless expressly having the thickness specified, includes any thin, flat extruded or cast thermoplastic article having a generally consistent and uniform thickness of about 0.5 millimeters (20 mils) or less in one dimension.

A "polymer film" is a film that is made of a polymer or a mixture of polymers. The composition of a polymer film is typically, 80 percent by weight of one or more polymers.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

Test Methods

"Hydroxyl number" or "hydroxyl value" is a measure of the content of free hydroxyl groups in a chemical substance. The hydroxyl number is the number of milligrams of potassium hydroxide (KOH) required to neutralize the acetic acid taken up on acetylation of one gram of a chemical substance that contains free hydroxyl groups. Hydroxyl number is usually expressed as milligrams of potassium hydroxide per gram of the chemical substance (mg KOH/g). The hydroxyl number is determined in accordance with DIN 53240.

"Hydroxyl group functionality" is the number of hydroxyl groups present in one molecule of a compound. Hydroxyl group functionality is measured in accordance with ASTM D4274-16 with results reported as an integer from 1 to 6 or more.

Compounds having isocyanate groups are characterized by a weight percentage of isocyanate groups based on a total weight of the compound. The weight percentage of isocyanate groups is termed "% NCO" and is measured in accordance with ASTM D2572-97.

Viscosity is measured at 25° C. or 40° C. in accordance with ASTM D2196, and is reported in mPa·s.

"Bond Strength Test": Laminates are cut into 15 mm width strips for T-peel test under 250 mm/min crosshead speed using a 5940 Series Single Column Table Top System available from Instron Corporation. During the test, the tail of each strip is pulled slightly by fingers to make sure the tail remained 90 degree to the peeling direction. Three strips for each sample are tested and the average value is calculated. Results are reported in units of N/15 mm. Higher values indicate a stronger bond (i.e., better bond strength).

DETAILED DESCRIPTION

The present disclosure provides a process. The process includes providing an isocyanate component A that is a reaction product of an aliphatic polyisocyanate, an aromatic polyisocyanate, an aliphatic polyester polyol, and a polyether polyol. The process includes providing a polyol component B including an aliphatic polyester polyol and a polyether polyol. Component A and component B each include an aliphatic polyester polyol having a viscosity from 800 to 6000 mPa·s at 25° C. and a hydroxyl number from 60 to 180 mg KOH/g. The process includes mixing component A and component B to form a solventless adhesive (SLA) composition. The SLA composition has (a) an initial viscosity at 40° C. from 500 to 1600 mPa·s, (b) an increasing viscosity ratio from 100% to 112% of the initial viscosity after the SLA composition stands at 40° C. for 10 min, and (c) a viscosity at 40° C. from 120% to 210% of the initial viscosity at a time 40 min after forming the SLA composition.

In an embodiment, the process includes applying the SLA composition to a first film at a lamination speed from 100 to 400 m/min to form an adhesive applied film. The process includes bonding the adhesive applied film to a second film at the lamination speed from 100 to 400 m/min to form a laminate product and curing the laminate product.

A. Isocyanate Component A

The process includes providing an isocyanate component A (or interchangeably referred to as component A). The isocyanate component A is the reaction product (i.e., is prepared from), of one or more polyisocyanates, (optionally with one or more isocyanates), and one or more polyols.

The polyisocyanate suitable includes, but is not limited to, an aromatic polyisocyanate, an aliphatic polyisocyanate, a carbodiimide-modified polyisocyanate or combinations thereof.

An "aliphatic polyisocyanate" is a polyisocyanate that is void of, or contains no, aromatic rings. Nonlimiting examples of suitable aliphatic polyisocyanates include methylene-bis(4-cyclohexylisocyanate); hexamethylene diisocyanate (HMDI) and its derivates such as HMDI dimer, HMDI trimer and HMDI adducts; HDI and its derivatives such as HDI trimer and HDI adducts; isophorone dipolyisocyanate (IPDI) and its derivates such as IPDI dimer, IPDI trimer and IPDI adducts; or combinations thereof.

In an embodiment, isocyanate component A (interchangeably referred to as component A), includes from 3 wt %, or 5 wt %, or 8 wt %, or 10 wt %, to 18 wt %, or 20 wt %, or 35 wt %, or 45 wt %, or 55 wt %, or 65 wt % of the aliphatic polyisocyanate based upon a total weight of component A. In a further embodiment, component A includes from 3 to 65 wt %, or from 5 to 55 wt %, or from 8 to 45 wt %, or from 10 to 35 wt % of the aliphatic polyisocyanate based upon a total weight of component A.

An "aromatic polyisocyanate" is a polyisocyanate containing one or more aromatic rings. Nonlimiting examples of suitable aromatic polyisocyanates include isomers of methylene diphenyl diisocyanate (MDI) such as 4,4'-MDI; 2,4'-MDI; and 2,2'-MDI; or modified MDI such as carbodiimide-modified MDI or allophanate modified MDI; isomers of toluene-diisocyanate (TDI) such as 2,4-TDI and 2,6-TDI; isomers of naphthalene-dipolyisocyanate (NDI) such as 1,5-NDI; or combinations thereof.

In an embodiment, component A includes from 18 wt %, or 20 wt %, or 25 wt %, or 30 wt %, to 40 wt %, or 50 wt %, or 60 wt %, or 70 wt %, or 80 wt % of the aromatic polyisocyanate based upon a total weight of component A. In a further embodiment, component A includes from 18 to 80 wt %, or from 20 to 70 wt %, or from 30 to 60 wt %, or from 25 to 40 wt % of the aromatic polyisocyanate based upon a total weight of component A.

The polyisocyanate may comprise two or more embodiments disclosed herein.

The polyol of isocyanate component A is selected from, but is not limited to, a polyester polyol, a polyether polyol or a combination thereof.

The aliphatic polyester polyol can be a polycondensate of polyols and dicarboxylic acids. In an embodiment, the dicarboxylic acids can be replaced, either partially or completely, with polycarboxylic acids (e.g., tricarboxylic acids, tetracarboxylic acids), hydroxycarboxylic acids, lactones, or combinations thereof. The polyester polyols can also be formed from polycarboxylic anhydrides or polycarboxylic esters of $C_1$ to $C_4$ alcohols.

The polyol used to prepare the aliphatic polyester polyol is selected from, but is not limited to, a diol, a triol, a tetraol or a combination thereof. Suitable diols include, but are not limited to, ethylene glycol, butylene glycol, diethylene glycol, triethylene glycol, and polyalkylene glycols, such as polyethylene glycol, and also 1,2-propanediol, 1,3-propanediol, 1,3-butanediol, 1,4-butanediol, 1,6-hexanediol, and neopentyl glycol.

The dicarboxylic acid used to prepare the aliphatic polyester polyol includes an aliphatic dicarboxylic acid. Nonlimiting examples of suitable aliphatic dicarboxylic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. In an embodiment, the dicarboxylic acid is a saturated aliphatic acid such as adipic acid or isophthalic acid.

In an embodiment, the anhydride of any acid disclosed herein can be used to prepare the aliphatic polyester polyol.

The use of monocarboxylic acids in component A is minimized, or in some cases avoided completely. Nonlimiting examples of monocarboxylic acids include hexanecarboxylic acid and benzoic acid.

In an embodiment, the aliphatic polyester polyol has a hydroxyl group functionality from 1.8, or 2.0 to 2.2, or 3. In a further embodiment, the aliphatic polyester polyol has a hydroxyl group functionality from 1.8 to 3, or from 2.0 to 2.2. An aliphatic polyester polyol having a hydroxyl group functionality greater than 2 is prepared from a polyol having a hydroxyl group functionality of 3. Nonlimiting examples of polyols having a hydroxyl group functionality of 3 include trimethylolpropane, glycerol, erythritol, pentaerythritol, trimethylolbenzene and trishydroxyethyl isocyanurate.

In an embodiment, the aliphatic polyester polyol has a molecular weight from 500 g/mol, or 700 g/mol, or 800 g/mol to 2,000 g/mol, or 3,000 g/mol, or 4,000 g/mol. In a further embodiment, the aliphatic polyester polyol has a molecular weight from 500 to 4,000 g/mol, or from 700 to 3,000 g/mol, or from 800 to 2,000 g/mol.

In an embodiment, the aliphatic polyester polyol has a hydroxyl number from 30, or 40, or 60 to 150, or 200, or 300. In a further embodiment, the aliphatic polyester polyol has a hydroxyl number from 30 to 300, or from 40 to 200, or from 60 to 150.

In an embodiment, the aliphatic polyester polyol has a viscosity at 25° C. from 800, or 1500, or 2000 to 6,000, or 10,000, or 15,000 mPa·s. In a further embodiment, the aliphatic polyester polyol has a viscosity at 25° C. from 800 to 15,000 mPa·s, or from 1500 to 10,000 mPa·s, or from 2000 to 6,000 mPa·s.

In an embodiment, component A has from 10 wt %, or 15 wt %, or 20 wt % to 25 wt %, or 35 wt %, or 45 wt %, of the aliphatic polyester polyol based upon a total weight of component A. In a further embodiment, component A has from 10 to 45 wt %, or from 15 to 35 wt %, or from 20 to 25 wt %, of the aliphatic polyester polyol based upon a total weight of component A.

In an embodiment, the aliphatic polyester polyol of component A is the same as the aliphatic polyester polyol of component B as further described herein. In other words the aliphatic polyester polyol of component A has the same structure, composition, and properties as the aliphatic polyester polyol of component B.

The polyether polyol of isocyanate component A includes, but is not limited to, a polyaddition product of ethylene oxide, propylene oxide, tetrahydrofuran or butylene oxide as well as the co-addition and/or grafted products thereof. In an embodiment, the polyether polyol includes a polyether polyol obtained by condensation of polyhydric alcohols. Nonlimiting examples of suitable polyether polyols include polypropylene glycol ("PPG"), polyethylene glycol ("PEG"), polybutylene glycol, and polytetramethylene ether glycol ("PTMEG").

In an embodiment, the polyether polyol has a hydroxyl group functionality from 1.8, or 1.9 to 2.1, or 3. In a further embodiment, the polyether polyol has a hydroxyl group functionality from 1.8 to 3, or from 1.9 to 2.1.

In an embodiment, the polyether polyol has a molecular weight from 200 g/mol, or 300 g/mol, or 400 g/mol, to 1,500 g/mol, or 2,000 g/mol, or 3,000 g/mol. In a further embodiment, the polyether polyol has a molecular weight from 200 to 3,000 g/mol, or from 300 to 2,000 g/mol, or from 400 to 1,500 g/mol.

In an embodiment, component A has from 5 wt %, or 10 wt %, or 15 wt %, to 30 wt %, or 35 wt %, or 40 wt % of the polyether polyol based upon a total weight of component A. In a further embodiment, component A has from 5 to 40 wt %, or from 10 to 35 wt %, or from 15 to 30 wt % of the polyether polyol based upon a total weight of component A.

The polyol of isocyanate component A can comprise two or more embodiments disclosed herein.

In an embodiment, component A includes a bio-based polyol, a nonlimiting example of which is castor oil. The bio-based polyol has a hydroxyl group functionality from 1.8, or 2, or 2.2 to 3, or 3.5, or 4. In an embodiment, the bio-based polyol has a hydroxyl group functionality from 1.8 to 4. When the bio-based polyol is present, component A has from 0.01 wt %, or 0.1 wt %, or 3 wt % to 5 wt %, or 10 wt %, 15 wt % of the bio-based polyol based upon a total weight of component A. In a further embodiment, component A has from 0.01 to 15 wt %, or from 0.1 to 10 wt %, or from 3 to 5 wt % of the bio-based polyol based upon a total weight of component A.

In an embodiment, component A has from 5% NCO, or 8% NCO, or 10% NCO to 19% NCO, or 22% NCO, or 25% NCO based upon a total weight of component A. In a further embodiment, component A has from 5 to 25% NCO, or from 8 to 22% NCO, or from 10 to 19% NCO based upon a total weight of component A.

In an embodiment, component A has a viscosity at 25° C. from 3,000, or 4,000, or 5,000 to 15,000, or 18,000, or 20,000 mPa·s. In a further embodiment, component A has a viscosity at 25° C. from 3,000 to 20,000 mPa·s, or from 4,000 to 18,000 mPa·s, or from 5,000 to 15,000 mPa·s.

The isocyanate component A may comprise two or more embodiments disclosed herein.

B. Polyol Component B

The process includes providing a polyol component B (or interchangeably referred to as component B), that includes at least one polyester polyol and at least one polyether polyol.

The polyester polyol of component B is an aliphatic polyester polyol. The aliphatic polyester polyol can be a polycondensate of polyols and dicarboxylic acids. In an embodiment, the dicarboxylic acids can be replaced, either partially or completely, with polycarboxylic acids (e.g., tricarboxylic acids, tetracarboxylic acids), hydroxycarboxylic acids, lactones, or combinations thereof. The polyester polyols can also be formed from polycarboxylic anhydrides or polycarboxylic esters of $C_1$ to $C_4$ alcohols.

The polyol used to prepare the aliphatic polyester polyol is selected from but is not limited to a diol, a triol, a tetraol or a combination thereof. Suitable diols include, but are not limited to, ethylene glycol, butylene glycol, diethylene glycol, triethylene glycol, and polyalkylene glycols, such as polyethylene glycol, and also 1,2-propanediol, 1,3-propanediol, 1,3-butanediol, 1,4-butanediol, 1,6-hexanediol, and neopentyl glycol.

The dicarboxylic acid used to prepare the aliphatic polyester polyol includes an aliphatic dicarboxylic acid. Nonlimiting examples of suitable aliphatic dicarboxylic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3,3-diethyl glutaric acid, 2,2-dimethyl succinic acid, and trimellitic acid. In an embodiment, the dicarboxylic acid is a saturated aliphatic acid such as adipic acid or isophthalic acid.

In an embodiment, the anhydride of any acid disclosed herein can be used to prepare the aliphatic polyester polyol.

The use of monocarboxylic acids in component B is minimized, or in some cases avoided completely. Nonlimiting examples of monocarboxylic acids include hexanecarboxylic acid and benzoic acid.

In an embodiment, the aliphatic polyester polyol has a hydroxyl group functionality from 1.8, or 2.0 to 2.2, or 3. In a further embodiment, the aliphatic polyester polyol has a hydroxyl group functionality from 1.8 to 3, or from 2.0 to 2.2. An aliphatic polyester polyol having a hydroxyl group functionality greater than 2 is prepared from a polyol having a hydroxyl group functionality of 3. Nonlimiting examples of polyols having a hydroxyl group functionality of 3 include trimethylolpropane, glycerol, erythritol, pentaerythritol, trimethylolbenzene and trishydroxyethyl isocyanurate.

In an embodiment, the aliphatic polyester polyol has a molecular weight from 500 g/mol, or 700 g/mol, or 800 g/mol to 2,000 g/mol, or 3,000 g/mol, or 4,000 g/mol. In a further embodiment, the aliphatic polyester polyol has a molecular weight from 500 to 4,000 g/mol, or from 700 to 3,000 g/mol, or from 800 to 2,000 g/mol.

In an embodiment, the aliphatic polyester polyol has a hydroxyl number from 30, or 40, or 60 to 150, or 200, or 300. In a further embodiment, the aliphatic polyester polyol has a hydroxyl number from 30 to 300, or from 40 to 200, or from 60 to 150.

In an embodiment, the aliphatic polyester polyol has a viscosity at 25° C. from 800, or 1500, or 2,000 to 6,000, or 10,000, or 15,000 mPa·s. In a further embodiment, the aliphatic polyester polyol has a viscosity at 25° C. from 800 to 15,000 mPa·s, or from 1500 to 10,000 mPa·s, or from 2000 to 6,000 mPa·s.

In an embodiment, component B has from 20 wt %, or 30 wt %, or 40 wt %, to 60 wt %, or 70 wt %, or 80 wt % of the aliphatic polyester polyol based upon a total weight of component B. In a further embodiment, component B has from 20 to 80 wt %, or from 30 to 70 wt %, or from 40 to 60 wt % of the aliphatic polyester polyol based upon a total weight of component B.

In an embodiment, the aliphatic polyester polyol of component B is the same as the aliphatic polyester polyol of component A. In other words the aliphatic polyester polyol of component B has the same structure, composition, and properties as the aliphatic polyester polyol of component A.

The aliphatic polyester polyol of component B may comprise two or more embodiments disclosed herein.

The polyether polyol of component B includes but is not limited to a polyaddition product of ethylene oxide, propylene oxide, tetrahydrofuran or butylene oxide as well as the co-addition and/or grafted products thereof. In an embodiment, the polyether polyol includes a polyether polyol obtained by condensation of polyhydric alcohols. Nonlimiting examples of suitable polyether polyols include polypropylene glycol ("PPG"), polyethylene glycol ("PEG"), polybutylene glycol, and polytetramethylene ether glycol ("PTMEG").

In an embodiment, the polyether polyol has a hydroxyl group functionality from 1.8, or 1.9 to 3.0, or 4.0. In a further embodiment, the polyether polyol has a hydroxyl group functionality from 1.8 to 4, or from 1.9 to 3.0.

In an embodiment, the polyether polyol has a molecular weight from 200 g/mol, or 300 g/mol, or 400 g/mol to 1,500 g/mol, or 2,000 g/mol, or 3,000 g/mol. In a further embodiment, the polyether polyol has a molecular weight from 200 to 3,000 g/mol, or from 300 to 2,000 g/mol, or from 400 to 1,500 g/mol.

In an embodiment, component B has from 10 wt %, or 15 wt %, or 20 wt %, to 30 wt %, or 40 wt %, or 60 wt %, of the polyether polyol based upon a total weight of component B. In a further embodiment, component B has from 10 to 60 wt %, or from 15 to 40 wt %, or from 20 to 30 wt %, of the polyether polyol based upon a total weight of component B.

The polyether polyol of component B may comprise two or more embodiments disclosed herein.

In an embodiment, component B includes a low molecular weight diol or a low molecular weight triol. In an embodiment, the a low molecular weight diol or a low molecular weight triol has a molecular weight from 48 g/mol to 200 g/mol.

In an embodiment, component B has a hydroxyl number from 150, or 180, or 200 to 350, or 380, or 400. In a further embodiment, component B has a hydroxyl number from 150 to 400, or from 180 to 380, or from 200 to 350.

In an embodiment, component B has a viscosity at 25° C. from 400, or 500, or 600 to 2000, or 2500, or 3000 mPa·s. In further embodiment, component B has a viscosity at 25° C. from 400 to 3000, or from 500 to 2500, or from 600 to 2000 mPa·s.

The polyol component B may comprise two or more embodiments disclosed herein.

C. Mixing A and B to Form an SLA Composition

The process includes mixing the isocyanate component A and the polyol component B to form the solventless adhesive (SLA) composition.

The SLA composition is an adhesive composition that is void of, or substantially void of, a solvent.

It is contemplated that component A and component B can be formed separately and, if desired, stored until it is desired to use the SLA composition. When it is desired to use the SLA composition, component A and component B are brought into contact with each other and mixed together. It is contemplated that when the two components are brought into contact, a curing reaction begins in which the isocyanate groups react with hydroxyl groups to form urethane linkages. The SLA composition formed by bringing the two components into contact is termed a "curable mixture."

In some embodiments, both component A and component B are in the liquid state at 25° C.

In an embodiment, a weight ratio of component A to component B is from 3:1, or 2.5:1, or 2.2:1 to 1.6:1, or 1.8:1, or 1:1. In a further embodiment, the weight ratio of component A to component B is from 3:1 to 1:1, or from 2.5:1 to 1.8:1, or from 2.2:1 to 1.6:1.

D. Viscosity

The SLA composition has an initial viscosity. The initial viscosity occurs immediately after component A and component B are mixed. In an embodiment, the initial viscosity at 40° C. is from 500, or 600, or 1,200 to 1,500, or 1,800, or 2,000 mPa·s. In a further embodiment, the initial viscosity at 40° C. is from 500 to 2,000 mPa·s, or from 600 to 1800 mPa·s, or from 1,200 to 1,500 mPa·s.

The SLA composition, after being formed, has an increasing viscosity ratio (IVR). The "increasing viscosity ratio" or "IVR," as used herein is the increase of the viscosity of the SLA composition expressed as a percentage of the initial viscosity. The IVR is measured after the SLA composition has remained at a specified temperature for a specified time period. In a further embodiment, the IVR is measured after the SLA composition has remained at 40° C. for a time period of 10 min. In an embodiment, the IVR is from 100 to 115 percent of the initial viscosity.

The SLA composition has an end viscosity. The "end viscosity," as used herein is expressed as a percentage of the initial viscosity. The end viscosity is measured after the SLA composition has remained at a specified temperature for a specified time period. In an embodiment, the end viscosity is measured after the SLA composition has remained from 35° C., or 40° C. to 45° C., or 50° C., or 55° C., or 60° C. for a time period from 10, or 20, or 30, or 35 to 40, or 45, or 50, or 60, or 70 min. In a further embodiment, the end viscosity is measured after the SLA composition has remained at 40° C. for a time period of 40 minutes after forming the SLA composition. In an embodiment, the end viscosity is from 140, or 160, or 180, or 190 to 200, or 210, or 240, or 300 percent of the initial viscosity. In a further embodiment, the end viscosity is from 140 to 300, or from 160 to 240, or from 190 to 210 percent of the initial viscosity.

E. Applying the SLA Composition

The process includes the step of applying the SLA composition to a first film at a lamination speed to form an adhesive applied film. The adhesive applied film includes the first film and the curable mixture.

The SLA composition is applied to the first film in a liquid state. In some embodiments, the SLA composition is in the liquid state at 25° C. In cases where the SLA composition is in the solid state at 25° C., the composition can be heated to convert it to the liquid state. In an embodiment, the composition is heated to a temperature from 35° C., or 40° C., or 45° C., or 50° C. to 55° C., or 65° C., or 70° C. or 80° C. In a further embodiment, the composition is heated to a temperature from 35° C. to 80° C., or from 40° C. to 70° C., or from 45° C. to 60° C.

In an embodiment, the lamination speed is from 50 meters per minute (m/min), or 70 m/min, or 80 m/min, or 100 m/min to 400 m/min, or 600 m/min, or 800 m/min, or 900 m/min, or 1,100 m/min. In a further embodiment, the lamination speed is from 50 to 1,100 m/min, or from 80 to 600 m/min, or from 100 to 400 m/min. Not wishing to be bound by any particular theory, it is believed that the SLA composition enables laminate products to be formed at lamination speeds from 400 m/min to 1,100 m/min (as mentioned above in this paragraph), because the speed of production is not hindered by the time needed to dry the solvent.

In an embodiment, the SLA composition is applied at a coating weight from 1.0, or 1.5, or 1.8 to 2.3, or 2.6, or 3.0 g/m². In a further embodiment, the SLA composition is applied at a coating weight from 1.0 to 3.0 g/m², or from 1.5 to 2.6 g/m² or from 1.8 to 2.3 g/m². Not wishing to be bound by any particular theory, the absence of solvent in the SLA composition enables a coating weight that is lower than the coating weight employed with solvent-based adhesives. A lower coating weight is advantageous to reduce costs, to reduce the weight of the adhesive applied to the film layers, and to reduce the weight of the laminate product.

The curable mixture of the adhesive applied film has a thickness from 1.0, or 1.5, or 1.8 to 2.3, or 2.5, or 3.0 μm. In an embodiment, the curable mixture of the adhesive applied film has a thickness from 1.5 to 2.5 μm, or from 1.8 to 2.3 μm.

The process includes the step of bonding the adhesive applied film to a second film at the lamination speed.

F. Curing the Laminate Product

The process includes the step of curing the uncured laminate to form a laminate product.

In an embodiment, the uncured laminate is heated (e.g., to speed the curing process). In a further embodiment, the uncured laminate is heated from 35° C., or 45° C. to 50° C., or 55° C. for a time period from 8 hours (h), or 12 h, or 18 h to 24 h, or 36 h, or 48 h, or 72 h. In yet a further embodiment, the uncured laminate is heated from 35 to 55° C., or from 45 to 55° C. for a time period from 8 to 72 h, or from 18 to 36 h. The heating time period is measured from the time the SLA composition is applied to a film.

The process may comprise two or more embodiments disclosed herein.

G. Laminate Product

The present disclosure provides a laminate product. The laminate product is a multilayer film.

In an embodiment, the multilayer film includes a first film layer, a second film layer and a solventless adhesive (SLA) layer between the first film layer and the second film layer. The SLA layer comprises the SLA composition prepared from the isocyanate component A and the polyol component B as described herein.

In an embodiment, the first film layer and the second film layer are independently selected from metal foil, metallized film, metal-coated polymer film, polymer film, ink-printed film, coated film, co-extruded film, polyester film, polyolefin film, polyamide film, copolymer film, paper, woven fabric, and nonwoven fabric.

Ink-printed film includes a film having a surface with an image, the image formed from an ink. In an embodiment, the ink contacts the SLA composition of the SLA layer.

In an embodiment, the composition of the first film layer is the same as the composition of the second film layer. In another embodiment, the composition of the first film layer is different than the composition of the second film layer.

A film layer (e.g., first film layer) has a thickness. In an embodiment, the thickness of the first film layer is the same as the thickness of the second film layer. Alternatively, the thickness of the first film layer is different than the thickness of the second film layer.

In an embodiment, the thickness of each film layer is from 40 μm, or 50 μm to 70 μm, or 80 μm. In a further embodiment, the thickness of a film layer is from 40 to 80 μm, or from 50 μm to 70 μm.

A film layer (e.g., first film layer) has a width. In an embodiment, each film layer has a width from 1000 mm, or 1200 mm, or 1400 mm, or 1500 mm, or 1600 mm, or 1700 mm to 1800 mm, or 1900 mm, or 2000 mm, or 2100 mm, or 2200 mm, or 2500 mm, or 3000 mm. In a further embodiment, each film layer has a width from 1000 to 3000 mm, or from 1500 to 1800 mm.

In an embodiment, the SLA layer directly contacts both the first film layer and the second film layer. "Directly contacts" refers to a layer configuration whereby the SLA layer is located immediately adjacent to the first film layer and no intervening layers or no intervening structures are present between the SLA layer and the first layer. Additionally, the SLA layer is located immediately adjacent to the second film layer and no intervening layers or no intervening structures are present between the SLA layer and the second film layer.

Each film layer may comprise two or more embodiments disclosed herein.

By way of example, and not limitation, some embodiments of the present disclosure will now be described in detail in the following Examples.

EXAMPLES

The raw materials for use in the Inventive Examples ("IE") and Comparative Samples ("CS") are detailed in Table 1 below.

TABLE 1

| Trade Name | Chemical Class and Description | Supplier |
|---|---|---|
| Component A | | |
| Isonate 50 OP | 2,4'-MDI/4,4'-MDI: Aromatic isocyanate monomer | The Dow Chemical Company |
| Desmodur N3300 | HDI trimer: Aliphatic polyisocyanate | Covestro |
| Desmodur W | HMDI: Aliphatic isocyanate monomer | Covestro |
| XCP-900D | Aliphatic polyester polyol: adipic acid with DEG OH number: 125 mg KOH/g; Viscosity at 25° C.: 2400 mPa · s | XuChuan |
| LH-1500NH | Aliphatic polyester polyol: adipic acid with HDO and NPG OH number: 75 mg KOH/g; Viscosity at 25° C.: 5400 mPa · s | XuChuan |
| Voranol P1010 | Polyether polyol; M.W.: 1000 | The Dow Chemical Company |
| Component B | | |
| Voranol CP450 | Polyether polyol M.W.: 450 | The Dow Chemical Company |
| Bester 648 | Aromatic polyester polyol: adipic acid with IPA and DEG OH number: 136 mg KOH/g; Viscosity at 25° C.: 3000 mPa · s | The Dow Chemical Company |
| Bester 105 | Aromatic polyester polyol: adipic acid, IPA and DEG OH number: 105 mg KOH/g; Viscosity at 25° C.: 7000 mPa · s | The Dow Chemical Company |
| Glycerin | Triol: hydroxyl group functionality = 3 | TCI |
| Components A and B | | |
| Bexter 90 | Aliphatic polyester polyol: adipic acid with DEG and MPD OH number: 140 mg KOH/g Viscosity at 25° C.: 1500 mPa · s | Expanded Polymer |
| Castor oil | Bio-based Polyol: OH number: 165 mg KOH/g | Vertellus Specialties |

Solventless adhesive (SLA) compositions for Inventive Examples IE1, IE2, IE3, IE4, IE5, IE6 and Comparative Samples CS1, CS2, CS3, CS4, CS5 are prepared according to the formulations listed in Table 2 using the raw materials listed in Table 1. In Table 2 materials for component A amount to 100 wt % for component A and materials for component B amount to 100 wt % for Component B.

The SLA compositions are used to prepare laminates from film substrates. The SLA compositions are applied onto a first film that is laminated with a second film to form the laminate product. The first film is selected from ink-printed polyethylene terephthalate (PET ink) and aluminum foil. The second film is selected from aluminum foil and 60 gauge polyethylene (PE60).

The films are laminated at 100 meters per minute with a coating weight of 2.0 g/m$^2$.

Lamination is conducted using a LABO-COMBI 400 machine from Nordmeccanica with a nip pressure of 0.4 psig, a nip temperature of 60° C., the resultant laminate products are cured at 40° C. for 24 h.

TABLE 2

| Raw material | IE1 | IE2 | IE3 | IE4 | IE5 | IE6 | CS1 | CS2 | CS3 | CS4 | CS5 |
|---|---|---|---|---|---|---|---|---|---|---|---|
| Component A | | | | | | | | | | | |
| Isonate 50 OP | 35 | 42.5 | 42.5 | 46 | 48 | 44 | 55 | 55 | 48 | 46 | 42.5 |
| Desmodur N3300 | | | 15 | 15 | 12 | 20 | | | 12 | 15 | |
| HMDI | 22 | 15 | | | | | | | | | 15 |
| XCP-900 | | | | 20 | 24 | | | 25 | | | |
| LH-1500NH | | | | 9 | 9 | | | 10 | | | |
| Bexter 90 | 43 | 42.5 | 42.5 | | | 38 | 45 | | | | |
| Voranol P1010L | | | | 10 | | | | 10 | 16 | 10 | 42.5 |
| Castor oil | | | | | 7 | | | | | | |
| Bester 105 | | | | | | | | | 24 | | |
| Bester 648 | | | | | | | | | | 29 | |
| Component B | | | | | | | | | | | |
| Bexter 90 | 65 | 65 | 65 | 65 | 65 | 65 | 65 | 65 | | | |
| Castor oil | | | | | | | | | | | 70 |
| Bester 648 | | | | | | | | | | 65 | |
| Voranol CP450 | 34 | 34 | 34 | 34 | 34 | 34 | 34 | 34 | 70 | 34 | 30 |
| Bester 105 | | | | | | | | | 30 | | |
| Glycerin | 1 | 1 | 1 | 1 | 1 | 1 | 1 | 1 | | 1 | |
| Bond Strength (N/15 mm) | | | | | | | | | | | |
| PET ink/Al | 2.2 | 2.1 | 2.4 | 2.0 | 2.1 | 2.3 | 2.2 | 2.3 | 2.0 | 1.8 | 0.8 |
| Al/PE60 | 6.5 | 7.0 | 6.8 | 6.2 | 5.8 | 6.0 | 6.4 | 6.7 | 6.9 | 4.6 | 2.0 |
| Optical Appearance After Aging Step | | | | | | | | | | | |
| PET ink/Al | I | I | I | I | I | I | III | III | III | III | III |
| Viscosity Measurements @40° C. (mPa·s) | | | | | | | | | | | |
| Initial) | 1322 | 1407 | 1580 | 1208 | 1480 | 1590 | 1389 | 1390 | 3200 | 2200 | 1412 |
| Increase at 10 min @40° C. | 1300 | 1410 | 1600 | 1190 | 1510 | 1560 | 1300 | 1410 | 3412 | 2289 | 2346 |
| Increase at 40 min @40° C. | 2800 | 2764 | 3000 | 2471 | 2790 | 2941 | 2874 | 2900 | 6140 | 4000 | 3542 |

B.S. is bond strength;
O.A. is optical appearance

Bond strength is measured in accordance with the bond strength test as described herein.

The optical appearance of white ink-printed laminates of PET ink/Al is evaluated by visual inspection immediately after the lamination step. Then, the laminate is subjected to aging step at 40° C. for two days. After aging is complete, thirty meters of the laminate is unwound and the external appearance of the unwound area is observed. The external appearance is evaluated based on the following criteria. Incidentally, "the external appearance at the time immediately after lamination" means the external appearance observed at not more than 5 minutes after the lamination step is completed.

External Appearance Immediately After Lamination
I: There were small dots that did not look wet.
II: There were large dots that did not look wet.
External Appearance After Aging Step
I: The external appearance was good with wetting uniformly.
II: With wetting uniformly, there were few dots that did not look wet.
III: There were many dots that did not look wet.

The optical appearance of laminates that are free of spots or white dots is denoted "good." The optical appearance of laminates that display spots or white dots is denoted "poor."

IE1-IE6 are laminates formed using an SLA composition having an aliphatic polyisocyanate, an aromatic polyisocyanate, and an aliphatic polyester polyol in component A and an aliphatic polyester polyol in component B. IE1 to IE6 display good optical appearance and good bond strength.

CS1 and CS2 are laminates formed using an SLA composition having only an aromatic polyisocyanate in component A and aliphatic polyester polyol in component B. CS1 and CS2 display good bond strength but poor optical appearance.

CS3 and CS4 are laminates formed using an SLA composition having an aliphatic polyisocyanate and an aromatic polyisocyanate in component A and an aromatic polyester polyol in place of the aliphatic polyester polyol in Component B. CS3 and CS4 display good bond strength but poor optical appearance.

CS5 is a laminate formed using an SLA composition having an aliphatic polyisocyanate and an aromatic polyisocyanate in component A and castor oil in place of the aliphatic polyester polyol in component B. CS5 displayed a poor strength and poor optical appearance.

Applicant unexpectedly discovered that laminates formed between metallized film and polymer film using a two-component SLA composition, each of the two components containing an aliphatic polyester polyol with a viscosity from 800 to 6000 mPa·s at 25° C. and a hydroxyl number from 60 to 180 mg KOH/g exhibit bond strength from 2.0 to 2.4 N/15 mm and display no optical defects, (i.e., no spots or white dots). The present examples demonstrate that the SLA composition containing (i) an aliphatic polyester polyol with a viscosity from 800 to 6000 mPa·s at 25° C. and a hydroxyl number from 60 to 180 mg KOH/g and (ii) an isocyanate component including an aliphatic polyisocyanate and an aromatic polyisocyanate is a suitable replacement for conventional solvent-based adhesives in laminate products.

It is specifically intended that the present disclosure not be limited to the embodiments and illustrations contained herein, but include modified forms of those embodiments including portions of the embodiments and combinations of elements of different embodiments as come with the scope of the following claims.

What is claimed is:

1. A process comprising:
   (i) providing an isocyanate component A that is a reaction product of an aliphatic polyisocyanate, an aromatic polyisocyanate, an aliphatic polyester polyol, and a polyether polyol;
   (ii) providing a polyol component B comprising an aliphatic polyester polyol and a polyether polyol;
   component A and component B each comprising an aliphatic polyester polyol having a viscosity from 800 to 6000 mPa·s at 25° C. and a hydroxyl number from 60 to 180 mg KOH/g;
   (iii) mixing component A and component B to form a solventless adhesive (SLA) composition, the SLA composition having;
      (a) an initial viscosity at 40° C. from 500 to 1600 mPa·s,
      (b) an increasing viscosity ratio from 100% to 112% of the initial viscosity after the SLA composition stands at 40° C. for 10 min, and
      (c) an end viscosity at 40° C. from 120% to 210% of the initial viscosity at a time 40 min after forming the SLA composition.

2. The process according to claim 1, comprising
   (iv) applying the SLA composition to a first film at a lamination speed from 80 m/min to 600 m/min to form an adhesive applied film;
   (v) bonding the adhesive applied film to a second film at the lamination speed from 80 m/min to 600 m/min to form an uncured laminate; and
   (vi) curing the uncured laminate to form a laminate product.

3. The process of claim 2 comprising
   providing the isocyanate component A with from 15 wt % to 45 wt % of the aliphatic polyester polyol, based on a total weight of the reaction product of isocyanate component A; and
   providing the polyol component B with from 30 wt % to 80 wt % of the aliphatic polyester polyol, based on a total weight of polyol component B;
   wherein the aliphatic polyester polyol of isocyanate component A is the same as the aliphatic polyester polyol of polyol component B.

4. The process of claim 3 comprising providing the isocyanate component A with from 8 wt % to 45 wt % of the aliphatic polyisocyanate and from 30 wt % to 60 wt % of the aromatic polyisocyanate, based on a total weight of the reaction product of isocyanate component A.

5. The process of claim 4, wherein the laminate product has a property selected from the group consisting of no spots, no white dots, and combinations thereof.

6. A solventless adhesive (SLA) composition comprising:
   an isocyanate component A that is a reaction product of an aliphatic polyisocyanate, an aromatic polyisocyanate, an aliphatic polyester polyol, and a polyether polyol;
   a polyol component B comprising an aliphatic polyester polyol and a polyether polyol;
   isocyanate component A and polyol component B each comprising an aliphatic polyester polyol having a viscosity from 800 to 6000 mPas at 25° C. and a hydroxyl number from 60 to 180 mg KOH/g, the SLA composition having;
      (a) an initial viscosity at 40° C. from 500 to 1600 mPa·s,
      (b) an increasing viscosity ratio from 100% to 112% of the initial viscosity after the SLA composition stands at 40°° C. for 10 min, and
      (c) an end viscosity at 40° C. from 120% to 210% of the initial viscosity at a time 40 min after forming the SLA composition.

7. The composition according to claim 6, wherein the aliphatic polyisocyanate is present in an amount from 8 wt % to 45 wt % and the aromatic polyisocyanate is present in an amount from 30 wt % to 60 wt % based on a total weight of the reaction product of isocyanate component A.

8. The composition of claim 6, wherein the aliphatic polyester polyol in the reaction product of isocyanate component A is present in an amount from 15 wt % to 45 wt % based on a total weight of isocyanate component A and the aliphatic polyester polyol in polyol component B is present in an amount from 30 wt % to 80 wt % based on a total weight of polyol component B, and
   wherein the aliphatic polyester polyol of component A is the same as the aliphatic polyester polyol of component B.

9. The composition of claim 6, wherein polyol component B further comprises a low molecular weight diol or a low molecular weight triol.

10. A laminate product comprising:
    a first film layer;
    a second film layer; and
    a solventless adhesive (SLA) layer between the first film layer and the second film layer, the SLA layer comprising;
    an isocyanate component A that is a reaction product of an aliphatic polyisocyanate, an aromatic polyisocyanate, an aliphatic polyester polyol, and a polyether polyol;
    a polyol component B comprising an aliphatic polyester polyol and a polyether polyol;
    isocyanate component A and polyol component B each comprising an aliphatic polyester polyol having a viscosity from 800 to 6000 mPas at 25° C. and a hydroxyl number from 60 to 180 mg KOH/g, the SLA layer having
       (a) an initial viscosity at 40°° C. from 500 to 1600 mPa·s,
       (b) an increasing viscosity ratio from 100% to 112% of the initial viscosity after the SLA composition stands at 40° C. for 10 min, and
       (c) an end viscosity at 40°° C. from 120% to 210% of the initial viscosity at a time 40 min after forming the SLA composition.

11. The laminate product according to claim 10, wherein the aliphatic polyisocyanate is present in an amount from 8 wt % to 45 wt % and the aromatic polyisocyanate is present in an amount from 30 wt % to 60 wt % based on a total weight of the reaction product of isocyanate component A.

12. The laminate product according to claim 10, wherein the aliphatic polyester polyol in the isocyanate component A is present in an amount from 15 wt % to 45 wt % based on a total weight of isocyanate component A and an amount of the aliphatic polyester polyol in the polyol component B is present in an amount from 30 wt % to 80 wt % based on a total weight of polyol component B.

13. The laminate product according to claim 10, the laminate product having a property selected from the group consisting of no spots, no white dots, and combinations thereof.

\* \* \* \* \*